Jan. 12, 1971  C. GENTAZ  3,555,133
METHOD FOR PRODUCING PELLETS
Filed Jan. 31, 1968
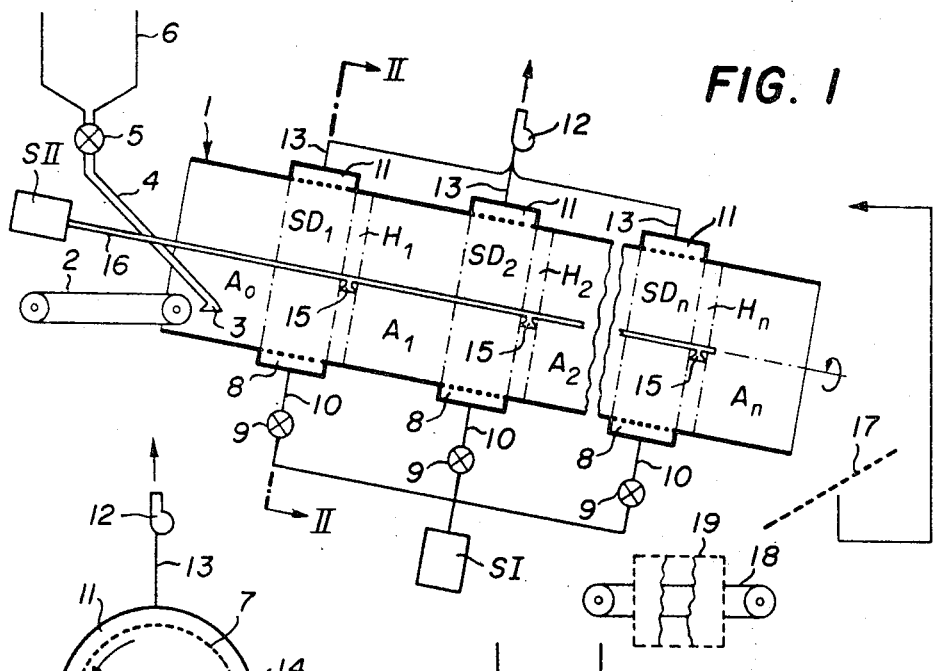
FIG. 1
FIG. 2
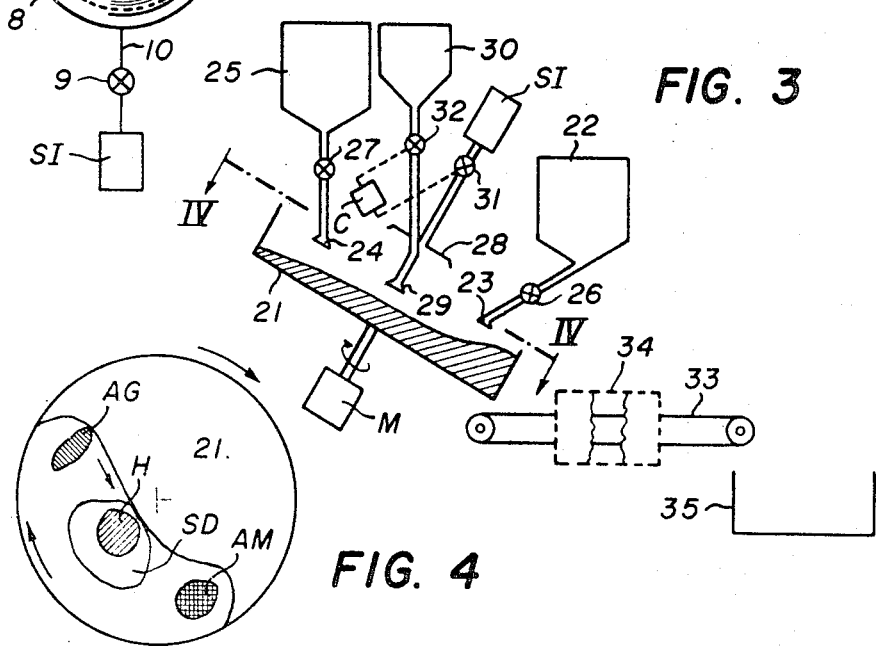
FIG. 3
FIG. 4

United States Patent Office 3,555,133
Patented Jan. 12, 1971

3,555,133
METHOD FOR PRODUCING PELLETS
Claude Gentaz, Grand-Lancy, Geneva, Switzerland, assignor to Battelle Memorial Institute, International Division, Geneva, Switzerland
Filed Jan. 31, 1968, Ser. No. 702,011
Claims priority, application Switzerland, Feb. 1, 1967,
1,569/67
Int. Cl. B01j 2/12
U.S. Cl. 264—82                 6 Claims

ABSTRACT OF THE DISCLOSURE

The invention provides a method for producing pellets from a finely divided material, such as fine iron ore. The method comprises rolling nuclei or seeds of inorganic colloidal binder and water on a tumbling bed of said material, moving along a closed loop or straight path, whereby particles of this material may agglomerate in layers on the nuclei to form pellets of gradually increasing size, and, while the pellets keep rolling on the bed, periodically hardening the binder in a peripheral region of each pellet to limit outward drift of the binder as the pellets become larger, and, immediately after each binder hardening operation, moistening the pellets so that they may agglomerate further layers of material particles, and, upon reaching the desired size, discharging the pellets and fully drying them to cause the binder contained therein to set throughout. The apparatus is designed to carry out the above method.

---

This invention relates to a method for producing pellets from a finely divided solid material, e.g. porous pellets of iron ore suitable for reduction without smelting.

The many known agglomeration methods used for producing iron ore pellets include a hardening operation by calcination, this hardening operation being necessary in order to impart to the pellets sufficient mechanical strength to withstand handling, transport and crushing during subsequent reduction, for instance in a blast-furnace. Such a hardening operation by calcination requires the use of costly installations and involves considerable heating costs.

In some of these agglomeration methods, a binder is used which is capable of imparting greater hardness to the moist pellets which are to be calcined. This addition of binder leads however to the formation, on the pellets, of a peripheral zone wherein the binder is very highly concentrated. Once the pellets have dried and the binder has hardened, this peripheral zone has very little porosity and thus constitutes a barrier which hinders the flow of gases through the pellets during subsequent reduction and which hence reduces the effectiveness of this operation.

An object of the present invention is to produce binder-containing pellets in such a way that the binder may be substantially evenly distributed within the pellets thereby imparting to the pellets high mechanical strength without having to resort to the heat hardening treatments.

According to the invention there is provided a method of producing pellets from a finely divided solid material, which comprises forming from said material a tumbling bed moving along a substantially pre-determined path, depositing on said bed at a set location nuclei of inorganic colloidal binder and water, rolling said nuclei on said bed whereby particles of said material may agglomerate in layers on said nuclei to form pellets of gradually increasing size, hardening the binder in the peripheral region of each pellet after the formation of each of said layers by drying each layer in the presence of a binder hardening agent, superficially moistening each layer after being subjected to said drying by sprinkling a fine shower of an aqueous solution of said binder to enable a subsequent said layer of said particles to agglomerate thereon, discharging pellets having reached the desired size from said bed, and subjecting said pellets of desired size to a stream of air mixed with a hardening agent thereby fully to dry said pellets and to cause the binder contained therein to set throughout.

Apparatus for carrying out the method comprises a container of circular cross-section having a supporting surface, a sloping axis of symmetry and a stationary pellet discharge region, first supply means for feeding dry finely divided solid material on to said supporting surface at a first set location, drive means cooperating with said container to rotate said container together with said surface about said axis whereby the material fed on to said surface at said first location may form a tumbling bed moving over said surface along a substantially predetermined path, second supply means for depositing nuclei of inorganic colloidal binder and water on said bed at a second set location whereby said nuclei may roll on said bed and particles of said material may agglomerate in layers thereon to form pellets of gradually increasing size, third supply means for directing drying air mixed with a binder hardening agent to at least one first set zone crossed by said bed thereby to harden the binder in the peripheral region of each pellet after the formation of each said layer, fourth supply means for sprinkling a fine shower of an aqueous solution of said binder on to at least one second set zone crossed by said bed thereby to moisten superficially each said layer after having been in contact with said drying air to enable a subsequent said layer of said particles to agglomerate thereon, and drying means for subjecting pellets of desired size issuing from said container through said stationary discharge region to a stream of drying air mixed with a hardening agent thereby fully to dry said pellets and to cause the binder therein to set throughout.

In the accompanying drawings:

FIG. 1 is a diagrammatic vertical section through a first embodiment of the apparatus provided by the invention;

FIG. 2 is a cross-section of this first embodiment, taken along line II—II of FIG. 1;

FIG. 3 is a diagrammatic vertical section through a second embodiment of the apparatus provided by the invention; and FIG. 4 is a top view of one of the components of this second embodiment, as viewed in the direction of arrows IV—IV of FIG. 3.

The apparatus shown in FIGS. 1 and 2 comprises an agglomeration drum 1 rotating about an axis which is slightly inclined in relation to the horizontal. The material to be agglomerated is provided in finely divided form by a source not shown and is continuously fed in a dry state, at an adjustable rate, by a metering band 2 into drum 1 at the upper end thereof to form in the drum a tumbling bed of this material. In rotary drums of this kind, the material forming the bed moves towards the lower end of the drum along a substantially rectilinear path, the tumbling motion of the bed being shown in FIG. 2 by a group of three arrows.

As can be seen from FIG. 1, drum 1 is divided up, along the length thereof, into zones referenced $A_0$, $A_1 \ldots A_n$; $SD_1$, $SD_2 \ldots SD_n$; and $H_1$, $H_2 \ldots H_n$. Zones $A_0$ and $A_1$ to $A_n$ are agglomeration zones, zones $SD_1$ to $SD_n$ are drying and hardening zones and zones $H_1$ to $H_n$ are moistening zones.

Moist nuclei in the form of large drops or nodules, consisting of a mixture of inorganic colloidal binder, such as a sodium silicate, and water, are deposited on the bed by a distributor 3 which is positioned inside drum 1 at the top end of zone $A_0$ in front of band 2, this distributor being connected by a supply line 4 and a valve 5 to a tank 6. The nuclei which are deposited on the bed of material in zone $A_0$ tumble with the bed and are drawn along by the latter to be subjected to a rolling motion thereon. Because of the moist nature of the nuclei, particles of the finely divided material making up the bed come to adhere to the surface of the nuclei during this rolling action to form embroyonic pellets which gradually increase in size while progressing through zone $A_0$. When reaching the end of zone $A_0$, these pellets are carried by the bed through the first drying and hardening zone $SD_1$ wherein they come in contact, while being rolled, with an air stream containing an agent for hardening the binder which diffuses from the nuclei into the enveloping coating of particles, this agent consisting for instance of $CO_2$ when the binder is a sodium silicate. The drying action is progressive and only lasts a short time in order that the drying and hardening of the embryonic pellets may only be partial, i.e. in order that only a thin peripheral layer of these embryonic pellets may be hardened. This layer thus forms a thin barrier which serves to limit the escape of binder from the pellets while being rolled on the bed in the subsequent zones of drum 1.

As can be seen from FIG. 2, the wall of drum 1 is formed with perforations 7 in the region of the drying and hardening zone $SD_1$. The lower portion of the drum is surrounded by a fixed chamber 8 from which the air containing the hardening agent, supplied thereto by a source SI, through a valve 9 and a supply duct 10, is fed into the drum through the perforations 7 lying opposite this chamber. The air supplied by this source can advantageously be heated, e.g. to 100° C., to help the drying action. The upper portion of the drum is surrounded by a fixed chamber 11 into which moistened air from the drying zone $SD_1$ is exhausted through the perforations 7 lying opposite chamber 11 by means of a suction device 12 connected to chamber 11 by an exhaust line 13. Although, in this embodiment, the moistened air passing into chamber 11 is discharged to atmosphere, it is possible to recycle part of the moistened air discharged by the suction device 12 in order to improve the economic efficiency of the drying and hardening operation, i.e. in order to reduce the losses of hardening agent and, should the air be heated, of heat.

A fixed arcuate shield 14, which is visible in FIG. 2, is provided in chambers 8 and 11, immediately outside that portion of the perforated area of drum 1, over which the tumbling bed comes to pass, in order to prevent air from flowing through, and hence distributing, the bed.

Immediately downstream of the drying and hardening zone $SD_1$, the pellets pass for a relatively short period of time through the first moistening zone $H_1$ where they are sprinkled with a fine shower of an aqueous solution of the same binder as that used to form the above-mentioned nuclei. For this purpose, use is made of a spray nozzle 15 which is connected by a line 16 to a source SII of this solution and which, as can be seen from FIG. 2, is directed sideways so as to sprinkle the pellets as they drop back with the tumbling bed after having been carried upwards therewith by the drum.

The pellets, after being moistened in zone $H_1$, then proceed to the agglomeration zone $A_1$ where they undergo a rolling operation on the dry bed of material and become progressively larger. As already mentioned, the drum 1 moreover comprises several other drying and hardening zones $SD_2$ to $SD_n$ that are respectively followed by moistening zones $H_2$ to $H_n$ and agglomeration zones $A_2$ to $A_n$. As is apparent from FIG. 1, identical components of the different zones have been given the same reference numerals 7 to 11 and 13 to 15 and the discharge of moist air is exhaust into the various chambers 11 by a single suction device 12.

Zones $SD_1$ to $SD_n$ are supplied with hardening-agent-contining air from source SI in the manner described above in connection with zone $SD_1$. The number of times the agglomeration, the drying and hardening, and the moistening zones repeating themselves along drum 1 will obviously depend on the size which the pellets are required to have, which size is basically determined by the overall length of the agglomeration zones and by the slope and speed of rotation of the drum.

The pellets, once they have reached the desired size, issue from the drum 1 at the lower end thereof at a set discharge region together with the particles of material forming the bed. The pellets are then separated from these particles by a sieve 17 and are collected by a conveyor belt 18 which conveys them through a chamber 19 crossed by a stream of air containing a hardening agent, in order to subject them to a final drying and hardening operation whereby the pellets may be fully dried and the binder contained therein may be caused to set throughout. Upon issuing from the chamber 19 the pellets are deposited by the conveyor belt 18 in a container 20 which could form part of plant intended for subsequent processing, such as reduction, of the pellets. As shown in FIG. 1, the particles of material collected by the sieve 17 are recycled, for example by returning them to the metering band 2.

The apparatus shown in FIG. 3 comprises an agglomeration table of known type in the form of a rotary pan 21, the bottom thereof being inclined at a given angle in relation to the horizontal. This pan is rotated at a given speed by a variable speed electric motor M. A hopper 22 supplies through a distributor 23 dry finely divided material to the pan 21. The distributor 23 is so positioned above the pan 21 as continuously to feed this material to a first set location identified in FIG. 4 by a cross-hatched area referenced AM. As is apparent from FIGS. 3 and 4, this location AM is crossed by a lower, downwardly moving, portion of the circular bottom of pan 21, and lies about two thirds of the distance from the centre to the periphery of the pan. The dry finely divided material issuing from the distributor 23 is thus first carried downwards to some extent and then upwards to form and sustain a bed of this material in the pan, which bed moves along a closed loop path and tumbles in a region crossed by an upper and upwardly moving portion of the pan bottom.

A second distributor 24, which is connected to a tank 25 containing a liquid mixture consisting of a binder, e.g. sodium silicate, and water, serves to form nuclei from this mixture in the form of large drops and to deposit them on the bed at a second set location identified by a cross-hatched area referenced AG in FIG. 4.

Valves 26 and 27 serve respectively to regulate the rate at which the dry material and the nuclei are dispensed by the distributors 23 and 24.

As can be seen from FIG. 4, arrows indicate the motion of the bed and zone AG is located near the tumbling region of the bed so that the nuclei may be carried downwards by the bed and roll thereon. This rolling action causes dry finely divided material to agglomerate on the nuclei to form initially embryonic pellets which progressively become larger as they keep turning round with the bed. As they become larger and heavier, the pellets tend to drop back, after being carried upwards, before reaching location AG thereby keeping out of the way of the fresh nuclei being deposited on the bed.

A third distributor 28 is connected to a source SI which supplies a mixture of air and hardening agent, e.g. $CO_2$ when the binder is a sodium silicate, and serves periodically to feed this mixture at a set zone, identified by area SD, on to the growing pellets so that the latter may be partially dried and hardened at given intervals. As can be seen from FIG. 4, this zone SD is located between locations AM and AG.

A fourth distributor 29 is connected to a tank 30 which contains an aqueous solution of the same binder as that used to form the above-mentioned nuclei, e.g. an aqueous solution of a sodium silicate. The distributor 29 sprinkles this solution periodically in fine shower form on to a set zone, referenced H in FIG. 4, in order to moisten the growing pellets. As can be seen from FIG. 4, the moistening zone H lies within the drying and hardening zone SD. The periodic supply of the mixture of air and hardening agent and the periodic supply of solution from tank 30 are respectively carried out by cyclically acting cut-off means 31 and 32 actuated by control means C so adjusted that each drying and hardening phase may immediately be followed by a relatively short pellet-moistening phase.

After these two successive phases, the moistened pellets are each time subjected, while the cut-off means 31 and 32 are closed off, to a third, agglomeration, phase, which agglomeration is brought about by the rolling action of the pellets on the dry bed. The pellets thus, in the course of formation, successively go several times through the drying and hardening phase, the moistening phase and the agglomeration phase until they reach, in successive stages, the desired size, this being determined by suitably choosing the speed of rotation and the slope of the pan.

Upon reaching the desired size, the pellets leave the pan at the lowermost point thereof and fall as can be seen from FIG. 3, on to a conveyor belt 33 which conveys them through a final drying and hardening chamber 34 crossed by a stream of air and hardening agent. The pellets issuing from this chamber 34 can then be stored in a container 35 which could form part of plant intended for subsequent processing, such as pellet reduction.

Various modifications may be made to the two preferred embodiments of the apparatus provided by the invention. For instance, the nuclei can be supplied to the rotating member in nodule form by a suitable extrusion device.

The invention is further illustrated by the following example

In this example, use was made of an apparatus such as that shown in FIGS. 3 and 4 and described above to produce iron ore pellets having a diameter of 15 mm. at the rate of 1 ton per hour.

The agglomeration pan had a diameter of 1 mm. and its peripheral flange had a height of 20 cm. The slope of the pan in relation to the horizontal was 50° and its speed of rotation was 16 r.p.m.

The ore to be agglomerated consisted of fine hydrated haematite having the following granulometry:

7.75% — <35 mesh.
35.4% — Ranging from 35 to 60 mesh.
56.85% — >60 mesh.

By way of binder an aqueous solution of sodium silicate was used wherein the pondreal relationship $SiO_2:Na_2O$ is 2.6. The concentration of the solution was 45% by weight and the quantity of solution amounted to 6% of the weight of the pellets, i.e. to 60 kg./h. Of this quantity 45 kg./h. were used to form nuclei in the form of large drops and 15 kg./h. were used for the periodic moistening of the pellets being formed.

For the drying and hardening purpose use was made of an air-$CO_2$ mixture comprising 85% of air and 15% of $CO_2$. This mixture was heated to 85° C. The drying and hardening operations to which the pellets were subjected during formation each lasted from 90 to 100 seconds and the moistening operations, with the sodium silicate solution, which were carried out immediately after the drying and hardening operations, lasted each time from 10 to 20 seconds. The pellets were then subjected each time to an agglomeration operation by rolling the pellets on the bed for 70 seconds. Thus, every hour about 20 drying and hardening operations and about 20 moistening operations were carried out.

The ore pellets that were produced under the above-mentioned conditions were uniformly porous. Their porosity amounted to about 40% and their density to 4 g./cm.$^3$.

The fact that the method according to the invention can be carried out without any substantial heating of the material to be agglomerated and that the uniform distribution of the binder within the resulting pellets provides the latter with good mechanical strength, makes it possible to apply this method to the agglomeration of many finely divided materials of widely differing natures.

In the case of iron ore, it is possible with this method to agglomerate indifferently magnetites and haematites as well as mixtures of these two materials. It is moreover possible with the present method either to maintain the ore in the same state of oxidation during agglomeration or to carry out agglomeration in a reducing atmosphere in order to achieve at least partial reduction of the one.

The uniform porosity which is achieved within pellets produced by the method according to the invention enables reducing agents easily to have access to the interior of the pellets thereby facilitating subsequent reduction, in particular with iron. This results in a notable reduction of the amount of reducing agents that is needed to extract the metal. Further, this reduction can be achieved by means of a relatively simple installation such as a shaft furnace wherein the pellets are brought into contact with a reducing agent such as hydrogen or carbon monoxide, while being heated, for example to 700° C. in the case of iron ore pellets. The pellets, once reduced, can then directly be melted in a suitable furnace, e.g. an arc furnace, and it will be clear that the reduction and melting furnaces could form constituent parts of a common plant for producing refined metal from fine ore.

When it is not intended immediately to melt the reduced pellets, it then becomes necessary to prevent rapid reoxidation by air. To this end, the pellets could, for instance, be compressed into billets to decrease the area of the reduced metal which is exposed to air.

Additional substances can, if desired, relatively easily be incorporated in the pellets, these substances being for instance added in powder form to the mixture which is used for agglomeration purposes. Thus, for instance, particularly with iron ore, coal dust could readily be incorporated in the pellets to facilitate their subsequent reduction, i.e. to render them self-reducing. During agglomeration, scorifying substances could also be added to the pellets to help subsequent refining. To this end, lime (CaO) and/or magnesium oxide (MgO) can be used to facilitate the refining of iron, i.e. to render the pellets self-melting.

What is claimed is:
1. In a method of producing pellets from finely divided solid ore material by rolling nodules of nuclei upon a rotating bed of said material through a series of agglomerating zones in which said pellets are subjected in each zone to superficial wetting and increases in size therein to form pellets of a final desired size, the improvement comprising:
 (a) mixing nuclei of an inorganic colloidal binder with water to form moist nodules thereof,
 (b) forming a rotating bed of said finely divided material in the dry state,
 (c) depositing said moist nodules upon said rotating bed in the first of said zones to agglomerate and coat said material upon said nodules to form pellets thereof,
 (d) rolling and drying said formed pellets in the presence of a gaseous hardening agent for said binder to harden the periphery of said formed pellets,
 (e) moving said formed pellets to the next zone and superficially wetting said pellets with a fine spray of said colloidal binder in water to provide further adherence of said dry rotating bed material upon said formed pellets to further agglomerate and enlarge said pellets,
 (f) drying said enlarged pellets in said gaseous hardening agent to harden the periphery of said enlarged pellets,
 (g) moving said enlarged pellets through succeeding agglomerating zones wherein the pellets in each zone are again subjected to the steps of superficial wetting with said binder and water, coating with said bed material, drying, and peripheral hardening until final pellets of a desired size are formed, and (h) fully drying said final pellets in the presence of said gaseous hardening agent to set said binder throughout said pellets.

2. A method as claimed in claim 1, wherein said binder consists of at least one of the following binders: a sodium silicate and a sodium aluminate.

3. A method as claimed in claim 2, wherein the concentration of said binder in said aqueous solution is between 30 and 55% by weight.

4. A method as claimed in claim 1, wherein the drying operations are carried out by means of a stream of gas containing said agent for hardening said binder, said stream having a temperature of at most 100° C.

5. A method as claimed in claim 1, wherein said hardening agent is carbon dioxide.

6. A method as claimed in claim 1, wherein the drying operations are carried out in a reducing atmosphere.

References Cited

UNITED STATES PATENTS

| | | | |
|---|---|---|---|
| 3,092,489 | 6/1963 | Smith | 264—117 |
| 3,161,707 | 12/1964 | Stirling | 264—117 |

OTHER REFERENCES

Agglomeration: Chemical Engineering magazine, October 1951, pages 161—164.

ROBERT F. WHITE, Primary Examiner

J. R. HALL, Assistant Examiner

U.S. Cl. X.R.

264—117

Dedication 3,555,133.—*Claude Gentaz*, Grand-Lancy, Geneva, Switzerland. METHOD FOR PRODUCING PELLETS. Patent dated Jan. 12, 1971. Dedication filed Mar. 26, 1984, by the assignee, *Battelle Memorial Institute*.

Hereby dedicates to the People of the United States the entire remaining term of said patent.

[*Official Gazette June 12, 1984.*]